US012568017B2

(12) United States Patent
May

(10) Patent No.: US 12,568,017 B2
(45) Date of Patent: Mar. 3, 2026

(54) EQUITABLE AVAILABILITY DISTRIBUTION REAL-TIME CALCULATOR

(71) Applicant: T-MOBILE INNOVATIONS LLC, Overland Park, KS (US)

(72) Inventor: John Christopher May, Clive, IA (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 331 days.

(21) Appl. No.: 18/378,318

(22) Filed: Oct. 10, 2023

(65) Prior Publication Data

US 2025/0119348 A1 Apr. 10, 2025

(51) Int. Cl.
H04L 41/082 (2022.01)
H04L 47/629 (2022.01)

(52) U.S. Cl.
CPC .......... H04L 41/082 (2013.01); H04L 47/629 (2013.01)

(58) Field of Classification Search
CPC ............................ H04L 41/082; H04L 47/629
See application file for complete search history.

(56) References Cited

U.S. PATENT DOCUMENTS

| | | | | |
|---|---|---|---|---|
| 9,301,167 B2 * | 3/2016 | Mahimkar | ........ | H04W 72/0473 |
| 9,788,362 B2 * | 10/2017 | Fu | .......................... | H04W 36/08 |
| 10,917,801 B2 * | 2/2021 | Yan | ....................... | H04W 88/10 |
| 2023/0232253 A1 * | 7/2023 | Apatachioae | ......... | H04W 24/04 |
| | | | | 455/424 |
| 2025/0142352 A1 * | 5/2025 | Kim | ...................... | H04W 16/18 |

* cited by examiner

*Primary Examiner* — Dhaval V Patel
(74) *Attorney, Agent, or Firm* — Shook, Hardy & Bacon L.L.P.

(57) ABSTRACT

Systems and methods are provided for providing an equitable availability distribution real-time calculator. More particularly, systems and methods reduce the potential for telecommunications outages following upgrades and allow markets better control over availability metrics. To do so, an outage indication is initially received that identifies a plurality of cell sites affected by an outage and a timeframe for an update corresponding to the outage to be deployed to each of the plurality of cell sites. A selection of a portion of the plurality of cell sites to deploy the update at a particular time within the timeframe is received. Real-time data is received from each cell site of the portion of the plurality of cell sites corresponding to the particular time within the timeframe. Using the real-time data, the impact of deploying the update for the portion of the plurality of cell sites at the particular time is determined.

20 Claims, 3 Drawing Sheets

1000
300

RECEIVE A MESSAGE AT A UE CORRESPONDING TO A USER ~302

FORWARD TEXT CORRESPONDING TO THE MESSAGE TO AN ANTI-SPAM ENGINE TO DETERMINE IF THE MESSAGE IS SPAM ~304

RECEIVE, AT THE UE, A RESPONSE FROM THE ANTI-SPAM ENGINE, THE RESPONSE COMPRISING A RECOMMENDATION TO THE USER ~306

PROMPTING THE USER, AT THE UE, TO TAKE AN ACTION CORRESPONDING TO THE MESSAGE ~308

400

MEMORY

412

PROCESSOR(S)

414

PRESENTATION
COMPONENT(S)

416

RADIO(S)

424

410

I/O PORT(S)

418

I/O COMPONENTS

420

POWER SUPPLY

422

EQUITABLE AVAILABILITY DISTRIBUTION REAL-TIME CALCULATOR

SUMMARY

A high-level overview of various aspects of the present technology is provided in this section to introduce a selection of concepts that are further described below in the detailed description section of this disclosure. This summary is not intended to identify key or essential features of the claimed subject matter, nor is it intended to be used as an aid in isolation to determine the scope of the claimed subject matter.

In aspects set forth herein, systems and methods are provided for providing an equitable availability distribution real-time calculator. More particularly, systems and methods reduce the potential for telecommunications outages following upgrades and allow markets better control over availability metrics. To do so, an outage indication is initially received. The outage indication identifies a plurality of cell sites affected by an outage and a timeframe for an update corresponding to the outage to be deployed to each of the plurality of cell sites. A selection of a portion of the plurality of cell sites to deploy the update at a particular time within the timeframe is received. Real-time data is received from each cell site of the portion of the plurality of cell sites corresponding to the particular time within the timeframe. Using the real-time data, the impact of deploying the update for the portion of the plurality of cell sites at the particular time is determined.

BRIEF DESCRIPTION OF THE SEVERAL VIEWS OF THE DRAWINGS

Implementations of the present disclosure are described in detail below with reference to the attached drawing figures, wherein.

DETAILED DESCRIPTION

Figure 1:
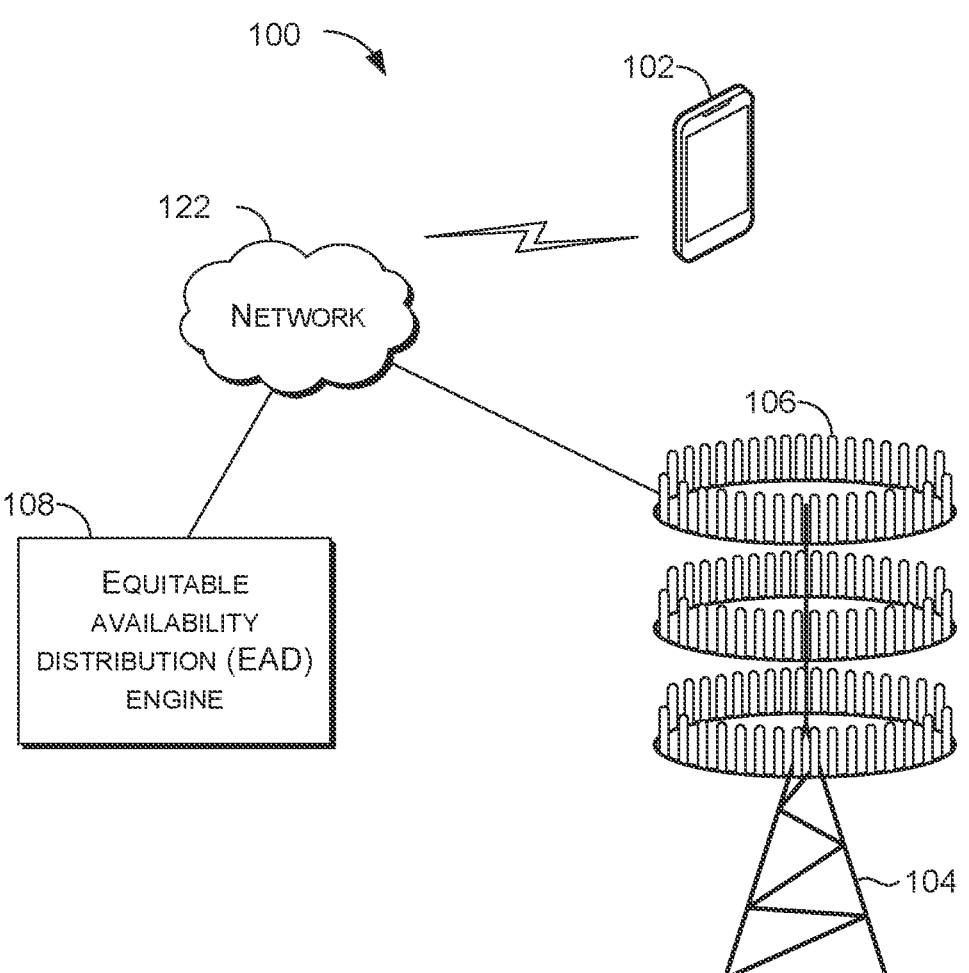
FIG. 1 depicts a diagram of an exemplary network environment in which implementations of the present disclosure may be employed.

The subject matter of embodiments of the invention is described with specificity herein to meet statutory requirements. However, the description itself is not intended to limit the scope of this patent. Rather, the inventors have contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Throughout this disclosure, several acronyms and shorthand notations are employed to aid the understanding of certain concepts pertaining to the associated system and services. These acronyms and shorthand notations are intended to help provide an easy methodology of communicating the ideas expressed herein and are not meant to limit the scope of embodiments described in the present disclosure. The following is a list of these acronyms:

3G Third-Generation Wireless Technology
4G Fourth-Generation Cellular Communication System
5G Fifth-Generation Cellular Communication System
6G Sixth-Generation Cellular Communication System
AI Artificial Intelligence
CD-ROM Compact Disk Read Only Memory
CDMA Code Division Multiple Access
eNodeB Evolved Node B
GIS Geographic/Geographical/Geospatial Information System
gNodeB Next Generation Node B
GPRS General Packet Radio Service
GSM Global System for Mobile communications
iDEN Integrated Digital Enhanced Network
DVD Digital Versatile Discs
EEPROM Electrically Erasable Programmable Read Only Memory
LED Light Emitting Diode
LTE Long Term Evolution
MIMO Multiple Input Multiple Output
MD Mobile Device
ML Machine Learning
PC Personal Computer
PCS Personal Communications Service
PDA Personal Digital Assistant
PDSCH Physical Downlink Shared Channel
PHICH Physical Hybrid ARQ Indicator Channel
PUCCH Physical Uplink Control Channel
PUSCH Physical Uplink Shared Channel
RAM Random Access Memory
RET Remote Electrical Tilt
RF Radio-Frequency
RFI Radio-Frequency Interference
R/N Relay Node
RNR Reverse Noise Rise
ROM Read Only Memory
RSRP Reference Signal Receive Power
RSRQ Reference Signal Receive Quality
RSSI Received Signal Strength Indicator
SINR Transmission-to-Interference-Plus-Noise Ratio
SNR Transmission-to-noise ratio
SON Self-Organizing Networks
TDMA Time Division Multiple Access
TXRU Transceiver (or Transceiver Unit)
UE User Equipment
UMTS Universal Mobile Telecommunications Systems
WCD Wireless Communication Device (interchangeable with UE)

Further, various technical terms are used throughout this description. An illustrative resource that fleshes out various aspects of these terms can be found in Newton's Telecom Dictionary, $32^{nd}$ Edition (2022).

Embodiments of the present technology may be embodied as, among other things, a method, system, or computer-program product. Accordingly, the embodiments may take the form of a hardware embodiment, or an embodiment combining software and hardware. An embodiment takes the form of a computer-program product that includes computer-useable instructions embodied on one or more computer-readable media.

Computer-readable media include both volatile and non-volatile media, removable and nonremovable media, and contemplate media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

By way of background, a traditional telecommunications network employs a plurality of base stations (i.e., access point, node, cell sites, cell towers) to provide network coverage. The base stations are employed to broadcast and transmit transmissions to user devices of the telecommunications network. An access point may be considered to be a portion of a base station that may comprise an antenna, a radio, and/or a controller. In aspects, an access point is defined by its ability to communicate with a user equipment (UE), such as a wireless communication device (WCD), according to a single protocol (e.g., 3G, 4G, LTE, 5G, and the like); however, in other aspects, a single access point may communicate with a UE according to multiple protocols. As used herein, a base station may comprise one access point or more than one access point. Factors that can affect the telecommunications transmission include, e.g., location and size of the base stations, and frequency of the transmission, among other factors. The base stations are employed to broadcast and transmit transmissions to user devices of the telecommunications network. Traditionally, the base station establishes uplink (or downlink) transmission with a mobile handset over a single frequency that is exclusive to that particular uplink connection (e.g., an LTE connection with an eNodeB). In this regard, typically only one active uplink connection can occur per frequency. The base station may include one or more sectors served by individual transmitting/receiving components associated with the base station (e.g., antenna arrays controlled by an eNodeB). These transmitting/receiving components together form a multi-sector broadcast arc for communication with mobile handsets linked to the base station.

As used herein, "base station" is one or more transmitters or receivers or a combination of transmitters and receivers, including the accessory equipment, necessary at one location for providing a service involving the transmission, emission, and/or reception of radio waves for one or more specific telecommunication purposes to a mobile station (e.g., a UE), wherein the base station is not intended to be used while in motion in the provision of the service. The term/abbreviation UE (also referenced herein as a user device or wireless communications device (WCD)) can include any device employed by an end-user to communicate with a telecommunications network, such as a wireless telecommunications network. A UE can include a mobile device, a mobile broadband adapter, or any other communications device employed to communicate with the wireless telecommunications network. A UE, as one of ordinary skill in the art may appreciate, generally includes one or more antennas coupled to a radio for exchanging (e.g., transmitting and receiving) transmissions with a nearby base station. A UE may be, in an embodiment, similar to device 400 described herein with respect to FIG. 4.

As used herein, UE (also referenced herein as a user device or a wireless communication device) can include any device employed by an end-user to communicate with a wireless telecommunications network. A UE can include a mobile device, a mobile broadband adapter, a fixed location or temporarily fixed location device, or any other communications device employed to communicate with the wireless telecommunications network. For an illustrative example, a UE can include cell phones, smartphones, tablets, laptops, small cell network devices (such as micro cell, pico cell, femto cell, or similar devices), and so forth. Further, a UE can include a sensor or set of sensors coupled with any other communications device employed to communicate with the wireless telecommunications network; such as, but not limited to, a camera, a weather sensor (such as a rain gage, pressure sensor, thermometer, hygrometer, and so on), a motion detector, or any other sensor or combination of sensors. A UE, as one of ordinary skill in the art may appreciate, generally includes one or more antennas coupled to a radio for exchanging (e.g., transmitting and receiving) transmissions with a nearby base station or access point.

Conventional mobile communications network systems consider availability as a metric that operations teams use as part of the measurement of customer experience. To do so, the availability metric considers the percentage of the network that is "available" for its customers to utilize. If a cell site goes down and customers cannot use a particular service, the corresponding market loses points of availability because that service was not available for its customers. Moreover, when telecommunications providers perform software upgrades (or otherwise services the network), there is not a standardized practice or tool that allows for the equitable distribution of the impact to availability. As a result, smaller or developing markets often suffer poor customer satisfaction and poor availability during outages.

Consider an upgrade to cell site routers that results in a twenty minute reset for X number of sites. This can generally be performed in the maintenance window, where the least amount of customers are impacted, but the volume varies substantially from market to market. For example, the Las Vegas market might have thirty-five percent of its total macro count (number of cell sites times number of sectors times layers of technology) reset in a single maintenance window, but the New England might only have six percent of its total cell sites reset in the same maintenance window. The result is an inequitable impact to the Las Vegas market.

The present disclosure is directed to systems, methods, and computer readable media for providing an equitable availability distribution real-time calculator. More particularly, systems and methods reduce the potential for telecommunications outages following upgrades and allow markets better control over availability metrics. To do so, an outage indication is initially received. The outage indication identifies a plurality of cell sites affected by an outage and a timeframe for an update corresponding to the outage to be deployed to each of the plurality of cell sites. A selection of a portion of the plurality of cell sites to deploy the update at a particular time within the timeframe is received. Real-time data is received from each cell site of the portion of the plurality of cell sites corresponding to the particular time within the timeframe. Using the real-time data, the impact of deploying the update for the portion of the plurality of cell sites at the particular time is determined.

This enables markets to make more educated decisions on actual availability impact. Moreover, real-time availability is scalable and can be used to manage outages across multiple markets. By way of example, consider the Des Moines market. Currently, the Des Moines market has 961,682,277 seconds of available time in the non-maintenance window (4G and 5G; 2G is excluded in this example). In the maintenance window, the Des Moines market has 312,723,438 seconds of available time. For clarity, available time is calculated for the non-maintenance window (NMW) by multiplying eighteen hours in the NMW by sixty minutes in an hour by sixty seconds in a minute and for the maintenance window (MW) by multiplying six hours in the NMW by sixty minutes in an hour by sixty seconds in a minute. Each site within the Des Moines market has a variable number of sectors and technologies. Assume site A has three sectors of L19, L21, L6, N6, and N25 as well as six sectors of N19, totaling twenty-one available technologies. Using the NMW and MW calculation above, this is ((64,800*21)+(21,600*21))=1,814,300 seconds of available time. Also assume site B has six sectors of L19, L21, L6, N6, and N25 and three sectors of N19, totaling thirty-three available technologies. Using the NMW and MW calculation above, this is ((64,800*21)+(21,600*21))=2,851,200 seconds of available time If the availability requirement for the Des Moines market for software upgrades is set to 99.8%, the real-time data can be leveraged to determine the impact if sites are down for twenty minutes each. Or, the real-time data can be leveraged to determine the impact for a portion of the sites being down for twenty minutes each. Further, the equitable availability distribution real-time calculator can propose the portion of sites being down for twenty minutes each to ensure the availability requirement is met.

Continuing the above example, consider a construction team wants to bring sites A and B down during the day for eighteen hours. In this scenario, the real-time downtime can be calculated by multiplying eighteen hours times sixty minutes in an hour times sixty seconds in a minute, or 64,800 seconds of downtime per technology. With fifty-four combined technologies, the real-time impact is 3,499,200 seconds of downtime. Recall there are 961,682,277 seconds of total downtime available to the market in the NMW (between 6 AM and 12 AM). So 3,499,200 seconds of downtime divided by 961,682,277 of total time equals 0.00363862. So taking the site down for 18 hours during the day results in a NMW availability score of 99.636138 percent.

In this scenario, the availability requirement for the Des Moines market is not met so sites A and B will need to be brought down separately or in combination with other sites providing less technologies. As can be appreciated, the equitable availability distribution real-time calculator can also be used to manage outages during natural disasters or in markets where a special event might necessitate the availability requirement being higher than normal (i.e., by analyzing the real-time data and determining network usage is higher than normal and automatically adjusting the availability requirement).

A first aspect of the present disclosure is directed to a method for providing an equitable availability distribution real-time calculator. An outage indication identifying a plurality of cell sites affected by an outage and a timeframe for an update corresponding to the outage to be deployed to each of the plurality of cell sites is received. A selection of a portion of the plurality of cell sites to deploy the update at a particular time within the timeframe is received. Real-time data is received from each cell site of the portion of the plurality of cell sites corresponding to the particular time within the timeframe. Using the real-time data, the impact of deploying the update for the portion of the plurality of cell sites at the particular time is determined.

A second aspect of the present disclosure is directed to a non-transitory computer storage media storing computer-usable instructions that when used by one or more processors, cause the one or more processors to perform operations. The operations comprise receiving an outage indication. The outage indication identifies a plurality of cell sites affected by an outage and a timeframe for an update corresponding to the outage to be deployed to each of the plurality of cell sites. The operations also comprise receiving a selection of a portion of the plurality of cell sites to deploy the update at a particular time within the timeframe. The operations further comprise receiving real-time data from each cell site of the portion of the plurality of cell sites corresponding to the particular time within the timeframe. The operations also comprise, utilizing the real-time data, determining the impact of deploying the update for the portion of the plurality of cell sites at the particular time.

Another aspect of the present disclosure is directed to a system for providing an equitable availability distribution real-time calculator. The system comprises: a plurality of cell sites configured to wirelessly communicate with an equitable availability distribution engine; and the equitable availability distribution engine. The equitable availability distribution engine is configured to: receive an outage indication, the outage indication identifying cell sites of the plurality of cell sites affected by an outage and a timeframe for an update corresponding to the outage to be deployed to each of the cell sites; receive a selection of a portion of the cell sites to deploy the update at a particular time within the timeframe; receive real-time data from each cell site of the portion of the plurality of cell sites corresponding to the particular time within the timeframe; and utilizing the real-time data, determine the impact of deploying the update for the portion of the plurality of cell sites at the particular time.

Turning to FIG. 1, a network environment suitable for use in implementing embodiments of the present disclosure is provided. Such a network environment is illustrated and designated generally as network environment 100. Network environment 100 is but one example of a suitable network environment and is not intended to suggest any limitation as to the scope of use or functionality of the disclosure. Neither should the network environment 100 be interpreted as having any dependency or requirement relating to any one or combination of components illustrated.

Figure 4:
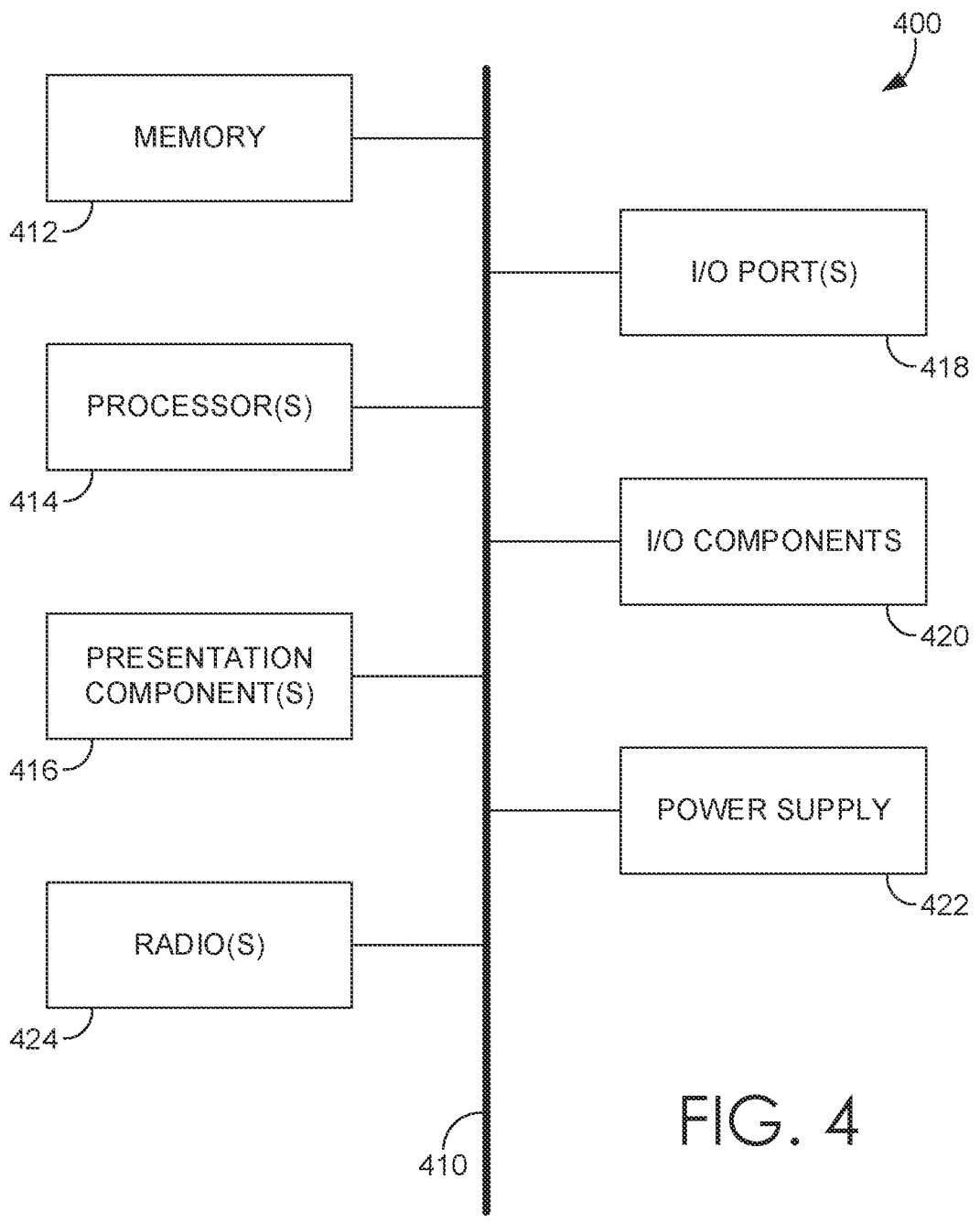
FIG. 4 depicts a diagram of an exemplary computing environment suitable for use in implementations of the present disclosure.

A network cell may comprise a base station to facilitate wireless communication between a communications device within the network cell, such as communications device 400 described with respect to FIG. 4, and a network. As shown in FIG. 1, a communications device may be a UE 102. In the network environment 100, UE 102 may communicate with other devices, such as mobile devices, servers, etc. The UE 102 may take on a variety of forms, such as a personal computer, a laptop computer, a tablet, a netbook, a mobile phone, a Smart phone, a personal digital assistant, or any other device capable of communicating with other devices. For example, the UE 102 may take on any form such as, for example, a mobile device or any other computing device capable of wirelessly communication with the other devices using a network. Makers of illustrative devices include, for example, Research in Motion, Creative Technologies Corp., Samsung, Apple Computer, and the like. A device can include, for example, a display(s), a power source(s) (e.g., a battery), a data store(s), a speaker(s), memory, a buffer(s), and the like. In embodiments, UE 102 comprises a wireless or mobile device with which a wireless telecommunication network(s) can be utilized for communication (e.g., voice and/or data communication). In this regard, the UE 102 can be any mobile computing device that communicates by way of, for example, a 5G network.

The UE 102 may utilize network 122 to communicate with other computing devices (e.g., mobile device(s), a server(s), a personal computer(s), etc.). In embodiments, network 122 is a telecommunications network, or a portion thereof. A telecommunications network might include an array of devices or components, some of which are not shown so as to not obscure more relevant aspects of the invention. Components such as terminals, links, and nodes (as well as other components) may provide connectivity in some embodiments. Network 122 may include multiple networks, as well as being a network of networks, but is shown in more simple form so as to not obscure other aspects of the present disclosure. Network 122 may be part of a telecommunications network that connects subscribers to their immediate service provider. In embodiments, network 122 is associated with a telecommunications provider that provides services to user devices, such as UE 102. For example, network 122 may provide voice services to user devices or corresponding users that are registered or subscribed to utilize the services provided by a telecommunications provider. Although it is contemplated network 122 can be any communication network providing voice and/or data service(s), such as, for example, a 1x circuit voice, a 3G network (e.g., CDMA, CDMA1000, WCDMA, GSM, UMTS), a 4G network (WiMAX, LTE, HSDPA), or the like, network 122 is depicted in FIG. 1 as a 5G network.

The network environment 100 may include a database (not shown). The database may be similar to the memory component 412 in FIG. 4 and can be any type of medium that is capable of storing information. The database can be any collection of records (e.g., network or device information). In one embodiment, the database includes a set of embodied computer-executable instructions that, when executed, facilitate various aspects disclosed herein. These embodied instructions will variously be referred to as "instructions" or an "application" for short.

As previously mentioned, the UE 102 may communicate with other devices by using a base station, such as base station 104. In embodiments, base station 104 is a wireless communications station that is installed at a fixed location, such as at a radio tower, as illustrated in FIG. 1. The radio tower may be a tall structure designed to support one or more antennas 106 for telecommunications and/or broadcasting. In other embodiments, base station 104 is a mobile base station. The base station 104 may be an MMU and include gNodeB for mMIMO/5G communications via network 122. In this way, the base station 104 can facilitate wireless communication between UE 102 and network 122.

As stated, the base station 104 may include a radio (not shown) or a remote radio head (RRH) that generally communicates with one or more antennas associated with the base station 104. In this regard, the radio is used to transmit signals or data to an antenna 106 associated with the base station 104 and receive signals or data from the antenna 106. Communications between the radio and the antenna 106 can occur using any number of physical paths. A physical path, as used herein, refers to a path used for transmitting signals or data. As such, a physical path may be referred to as a radio frequency (RF) path, a coaxial cable path, cable path, or the like.

The antenna 106 is used for telecommunications. Generally, the antenna 106 may be an electrical device that converts electric power into radio waves and converts radio waves into electric power. The antenna 106 is typically positioned at or near the top of the radio tower as illustrated in FIG. 1. Such an installation location, however, is not intended to limit the scope of embodiments of the present invention. The radio associated with the base station 104 may include at least one transceiver configured to receive and transmit signals or data.

In practice, the network 122 in a particular market is supported by a number of base stations, each providing network services to a number of UEs. As can be appreciated, the number of base stations in each market varies in accordance with a number of factors, including, but not limited to, market size, market density, and the like. Moreover, overlap in service coverage also varies from market to market. For example, in a more dense market, a number of base stations may provide overlapping coverage such that more than a single base station could, at any given time, provide network services to a particular UE. In contrast, in a less dense market, a single base station may provide coverage such that, at any given time, network services can only be provided to a particular UE by the single base station. Each of these factors may be determined in real-time and cause adjustments to the availability in a market as well the impact of outages and/or updates.

Continuing, the network environment 100 may further include an equitable availability distribution (EAD) engine 108. The EAD engine 108 may be configured to, among other things, receive real-time data corresponding to base stations in one or more markets. Though EAD engine 108 is illustrated as a standalone device (e.g., a server having one or more processors), it may be a plurality of devices providing the functionality described herein and may be remotely located. In various aspects, the EAD engine 108 is a component of base station 104 or a service provided via the network 122.

Figure 2:
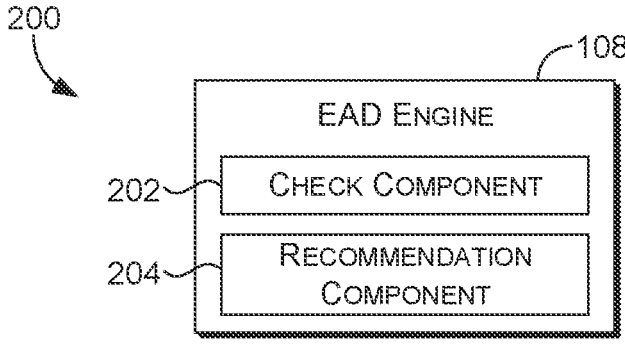
FIG. 2 illustrates an example equitable availability distribution engine, in accordance with aspects herein.

Referring now to FIG. 2, the EAD engine 108 may include, among other things, check component 202 and recommendation component 204. The EAD engine 108 may receive, among other things, real-time data from a plurality of base stations (such as base station 104) within a particular market or multiple markets. The real-time data may comprise the number of seconds in a NMW, the number of seconds in a MW, the number of technologies provided by each base station at a particular point in time, overlapping coverage provided by neighboring base stations, real-time data corresponding to network usage, and the like.

Check component 202 generally receives an outage indication. The outage indication may identify a plurality of cell sites affected by an outage and a timeframe for an update corresponding to the outage to be deployed to each of the plurality of cell sites. Check component 202 may also receive a selection of a portion of the plurality of cell sites to deploy the update at a particular time within the timeframe. Check component 202 may further receive real-time data from each cell site of the portion of cell sites corresponding to the particular time within the timeframe.

For example, continuing the Des Moines scenario above, check component 202 may receive the outage indication from the construction team that wants to bring sites down during the day for eighteen hours. Check component 202 may also receive a selection of sites A and B for the construction team to deploy the update within the eighteen hour timeframe. Check component 202 may further receive real-time data from sites A and B identifying a number of sectors, a number of technologies, usage information, and the like.

Recommendation component 204 generally utilizes the real-time information received by check component 202 to determine the impact of deploying the update for the portion of the plurality of cell sites at the particular time. Recommendation component 204 may compare the impact to a threshold or required availability for the particular market. In some aspects, recommendation component 204 may recommend an alternative combination of sites to stay above the threshold or the required availability. In some aspects, the alternative combination of sites may be sites from other markets or a combination of markets, including the particular market.

In some aspects, recommendation component 204 solicits approval from a local market team, and, upon receiving approval, automatically schedules the update for the portion of the plurality of cell sites at the particular time. In some aspects, recommendation component 204 provides a geographic representation of the effect of deploying the update for the portion of the plurality of cell sites within a particular market.

Figure 3:
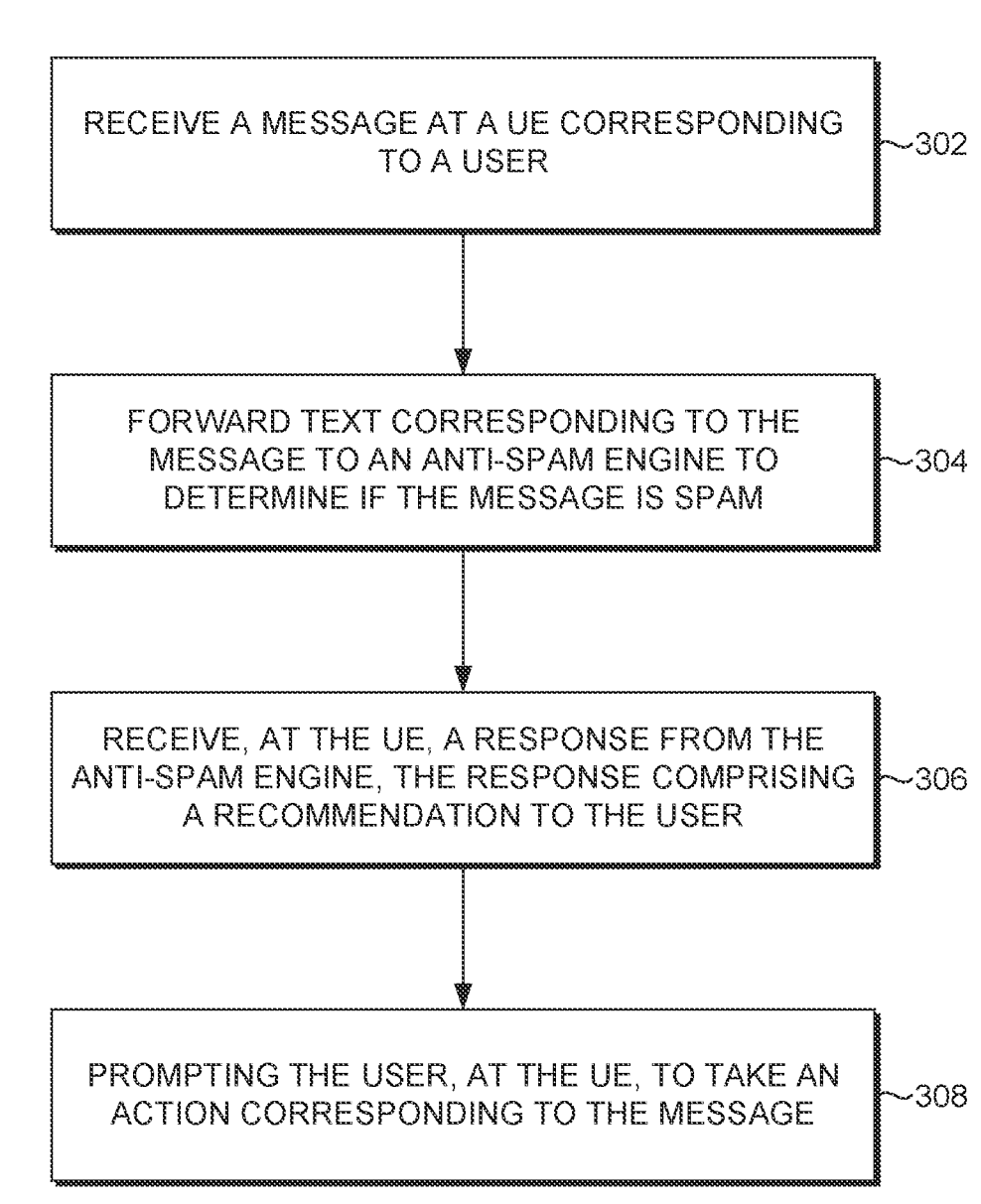
FIG. 3 depicts a flow diagram of a method for providing an equitable availability distribution real-time calculator, in accordance with aspects herein.

Referring to FIG. 3, a flow diagram is provided depicting a method 300 for providing an equitable availability distribution real-time calculator, in accordance with aspects of the present invention. Method 300 may be performed by any computing device (such as computing device described with respect to FIG. 4) with access to an EAD engine (such as the one described with respect to FIGS. 1 and 2) or by one or more components of the network environment described with respect to FIG. 1 (such as UE 102, base station 104, or EAD engine 108).

At step 302, an outage indication is received. The outage indication identifies a plurality of cell sites affected by an outage and a timeframe for an update corresponding to the outage to be deployed to each of the plurality of cell sites. At step 304, a selection of a portion of the plurality of cell sites to deploy the update at a particular time within the timeframe is received.

At step 306, real-time data is received from each cell site of the portion of the plurality of cell sites corresponding to the particular time within the timeframe. In aspects, real-time data comprises one or more of: customer traffic data, total amount of available time, and a number of technologies.

At step 308, utilizing the real-time data, the impact of deploying the update for the portion of the plurality of cell sites at the particular time is determined. The impact may describe the percentage of a particular market affected by the outage at the particular time. Or, the impact may describe the percentage of a particular market not affect by the outage at the particular time. In some aspects, the impact is communicated to a local market team for approval to deploy the update. Upon receiving the approval, the update may be automatically scheduled for the portion of the plurality of cell sites at the particular time. In some aspects, a geographic representation of the effect of deploying the update for the portion of the plurality of cell sites within a particular market is provided. In some aspects, if the impact is above a configurable threshold for a particular market, an alternative portion of the plurality of cell sites is provided that decreases the impact to be below a configurable threshold.

Embodiments of the technology described herein may be embodied as, among other things, a method, a system, or a computer-program product. Accordingly, the embodiments may take the form of a hardware embodiment, or an embodiment combining software and hardware. The present technology may take the form of a computer-program product that includes computer-useable instructions embodied on one or more computer-readable media. The present technology may further be implemented as hard-coded into the mechanical design of network components and/or may be built into a broadcast cell or central server.

Computer-readable media includes both volatile and non-volatile, removable and non-removable media, and contemplate media readable by a database, a switch, and/or various other network devices. Network switches, routers, and related components are conventional in nature, as are methods of communicating with the same. By way of example, and not limitation, computer-readable media may comprise computer storage media and/or non-transitory communications media.

Computer storage media, or machine-readable media, may include media implemented in any method or technology for storing information. Examples of stored information include computer-useable instructions, data structures, program modules, and other data representations. Computer storage media may include, but are not limited to, RAM, ROM, EEPROM, flash memory or other memory technology, CD-ROM, digital versatile discs (DVD), holographic media or other optical disc storage, magnetic cassettes, magnetic tape, magnetic disk storage, and/or other magnetic storage devices. These memory components may store data momentarily, temporarily, and/or permanently, and are not limited to the examples provided.

Communications media typically store computer-useable instructions—including data structures and program modules—in a modulated data signal. The term "modulated data signal" refers to a propagated signal that has one or more of its characteristics set or changed to encode information in the signal. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

Referring to FIG. 4, a block diagram of an exemplary computing device 400 suitable for use in implementations of the technology described herein is provided. In particular, the exemplary computer environment is shown and designated generally as computing device 400. Computing device 400 is but one example of a suitable computing environment and is not intended to suggest any limitation as to the scope of use or functionality of the invention. Neither should computing device 400 be interpreted as having any dependency or requirement relating to any one or combination of components illustrated. It should be noted that although some components in FIG. 4 are shown in the singular, they may be plural. For example, the computing device 400 might include multiple processors or multiple radios. In aspects, the computing device 400 may be a UE/WCD, or other user device, capable of two-way wireless communications with an access point. Some non-limiting examples of the computing device 400 include a cell phone, tablet, pager, personal electronic device, wearable electronic device, activity tracker, desktop computer, laptop, PC, and the like.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

As shown in FIG. 4, computing device 400 includes a bus 410 that directly or indirectly couples various components together, including memory 412, processor(s) 414, presentation component(s) 416 (if applicable), radio(s) 424, input/output (I/O) port(s) 418, input/output (I/O) component(s) 420, and power supply(s) 422. Although the components of FIG. 4 are shown with lines for the sake of clarity, in reality, delineating various components is not so clear, and metaphorically, the lines would more accurately be grey and fuzzy. For example, one may consider a presentation component such as a display device to be one of I/O components 420. Also, processors, such as one or more processors 414, have memory. The present disclosure hereof recognizes that such is the nature of the art, and reiterates that FIG. 4 is merely illustrative of an exemplary computing environment that can be used in connection with one or more implementations of the present disclosure. Distinction is not made between such categories as "workstation," "server," "laptop," "handheld device," etc., as all are contemplated within the scope of the present disclosure and refer to "computer" or "computing device."

Memory 412 may take the form of memory components described herein. Thus, further elaboration will not be provided here, but it should be noted that memory 412 may include any type of tangible medium that is capable of storing information, such as a database. A database may be any collection of records, data, and/or information. In one embodiment, memory 412 may include a set of embodied computer-executable instructions that, when executed, facilitate various functions or elements disclosed herein. These embodied instructions will variously be referred to as "instructions" or an "application" for short.

Processor 414 may actually be multiple processors that receive instructions and process them accordingly. Presentation component 416 may include a display, a speaker, and/or other components that may present information (e.g., a display, a screen, a lamp (LED), a graphical user interface (GUI), and/or even lighted keyboards) through visual, auditory, and/or other tactile cues.

Radio 424 represents a radio that facilitates communication with a wireless telecommunications network. Illustrative wireless telecommunications technologies include CDMA, GPRS, TDMA, GSM, and the like. Radio 424 might additionally or alternatively facilitate other types of wireless communications including Wi-Fi, WiMAX, LTE, 3G, 4G, LTE, mMIMO/5G, NR, VOLTE, or other VoIP communications. As can be appreciated, in various embodiments, radio 424 can be configured to support multiple technologies and/or multiple radios can be utilized to support multiple technologies. A wireless telecommunications network might include an array of devices, which are not shown so as to not obscure more relevant aspects of the invention. Components such as a base station, a communications tower, or even access points (as well as other components) can provide wireless connectivity in some embodiments.

The input/output (I/O) ports 418 may take a variety of forms. Exemplary I/O ports may include a USB jack, a stereo jack, an infrared port, a firewire port, other proprietary communications ports, and the like. Input/output (I/O) components 420 may comprise keyboards, microphones, speakers, touchscreens, and/or any other item usable to directly or indirectly input data into the computing device 400.

Power supply 422 may include batteries, fuel cells, and/or any other component that may act as a power source to supply power to the computing device 400 or to other network components, including through one or more electrical connections or couplings. Power supply 422 may be configured to selectively supply power to different components independently and/or concurrently.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. A method for providing an equitable availability distribution real-time calculator, the method comprising:

receiving an outage indication, the outage indication identifying a plurality of cell sites affected by an outage and a timeframe for an update corresponding to the outage to be deployed to each of the plurality of cell sites;

receiving a selection of a portion of the plurality of cell sites to deploy the update at a particular time within the timeframe;

receiving real-time data from each cell site of the portion of the plurality of cell sites corresponding to the particular time within the timeframe; and using the real-time data, determining the impact of deploying the update for the portion of the plurality of cell sites at the particular time.

2. The method of claim 1, further comprising communicating the impact to a local market team for approval to deploy the update.

3. The method of claim 2, further comprising, upon receiving the approval, automatically scheduling the update for the portion of the plurality of cell sites at the particular time.

4. The method of claim 1, further comprising providing a geographic representation of the effect of deploying the update for the portion of the plurality of cell sites within a particular market.

5. The method of claim 1, wherein the real-time data comprises one or more of: customer traffic data, total amount of available time, and a number of networks.

6. The method of claim 1, wherein the impact describes the percentage of a particular market affected by the outage at the particular time.

7. The method of claim 1, further comprising determining the impact is above a configurable threshold for a particular market.

8. The method of claim 7, further comprising providing an alternative portion of the plurality of cell sites that decreases the impact to be below a configurable threshold.

9. A non-transitory computer storage media storing computer-usable instructions that, when used by one or more processors, cause the one or more processors to perform operations, the operations comprising:

receiving an outage indication, the outage indication identifying a plurality of cell sites affected by an outage and a timeframe for an update corresponding to the outage to be deployed to each of the plurality of cell sites;

receiving a selection of a portion of the plurality of cell sites to deploy the update at a particular time within the timeframe;

receiving real-time data from each cell site of the portion of the plurality of cell sites corresponding to the particular time within the timeframe; and using the real-time data, determining the impact of deploying the update for the portion of the plurality of cell sites at the particular time.

10. The media of claim 9, further comprising communicating the impact to a local market team for approval to deploy the update.

11. The media of claim 10, further comprising, upon receiving the approval, automatically scheduling the update for the portion of the plurality of cell sites at the particular time.

12. The media of claim 9, further comprising providing a geographic representation of the effect of deploying the update for the portion of the plurality of cell sites within a particular market.

13. The media of claim 9, wherein the real-time data comprises one or more of: customer traffic data, total amount of available time, and a number of networks.

14. The media of claim 9, wherein the impact describes the percentage of a particular market affected by the outage at the particular time.

15. The media of claim 9, further comprising determining the impact is above a configurable threshold for a particular market.

16. The media of claim 15, further comprising providing an alternative portion of the plurality of cell sites that decreases the impact to be below a configurable threshold.

17. A system for providing an equitable availability distribution real-time calculator, the system comprising:

a plurality of cell sites configured to wirelessly communicate with an equitable availability distribution engine;

the equitable availability distribution engine configured to:

(1) receive an outage indication, the outage indication identifying cell sites of the plurality of cell sites affected by an outage and a timeframe for an update corresponding to the outage to be deployed to each of the cell sites;

(2) receive a selection of a portion of the cell sites to deploy the update at a particular time within the timeframe;

(3) receive real-time data from each cell site of the portion of the plurality of cell sites corresponding to the particular time within the timeframe; and (4) using the real-time data, determine the impact of deploying the update for the portion of the plurality of cell sites at the particular time.

18. The system of claim 17, further comprising:

communicating the impact to a local market team for approval to deploy the update; and upon receiving the approval, automatically scheduling the update for the portion of the plurality of cell sites at the particular time.

19. The system of claim 17, further comprising providing a geographic representation of the effect of deploying the update for the portion of the plurality of cell sites within a particular market.

20. The media of claim 17, further comprising:

determining the impact is above a configurable threshold for a particular market; and providing an alternative portion of the plurality of cell sites that decreases the impact to be below a configurable threshold.

* * * * *